UNITED STATES PATENT OFFICE.

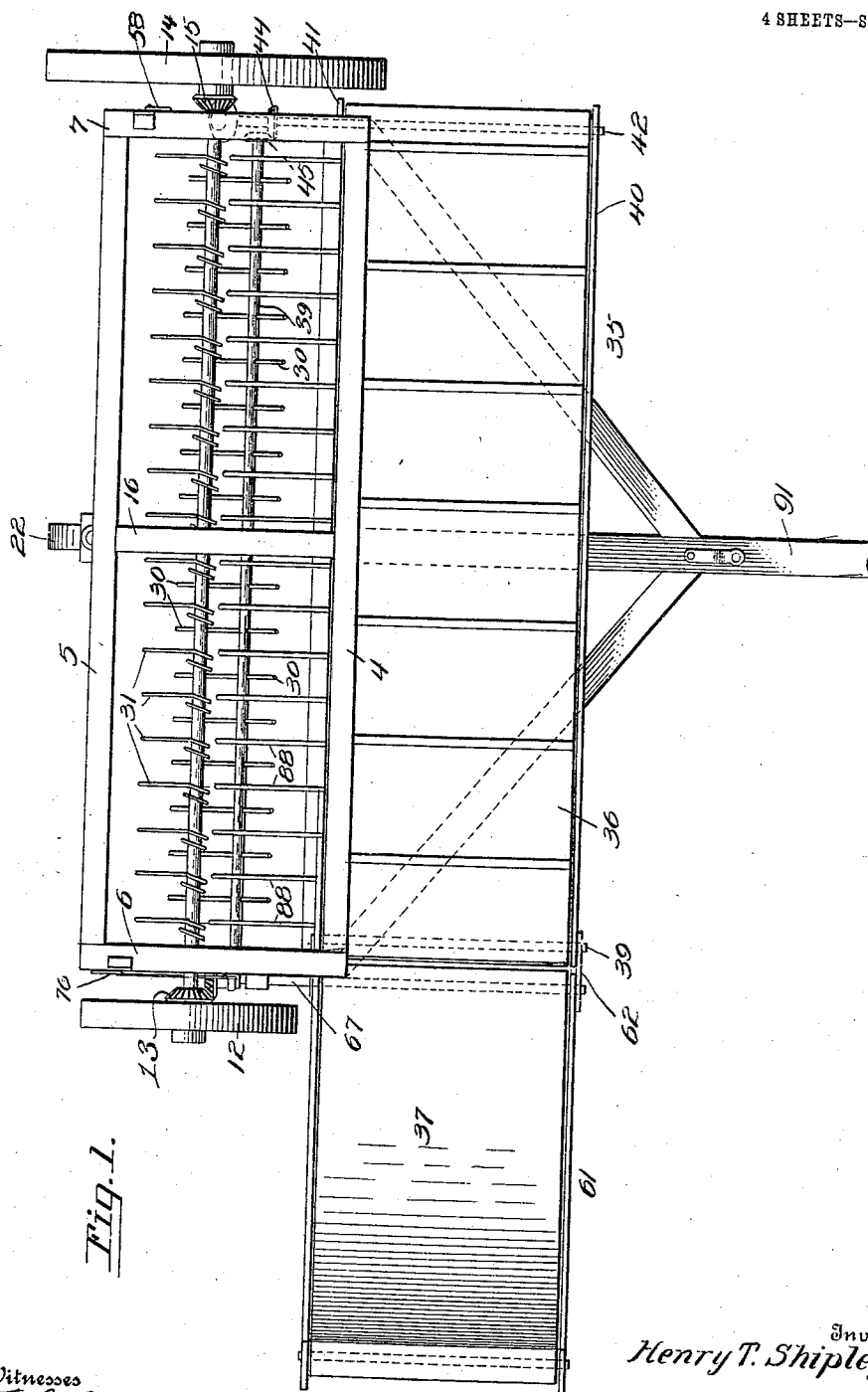

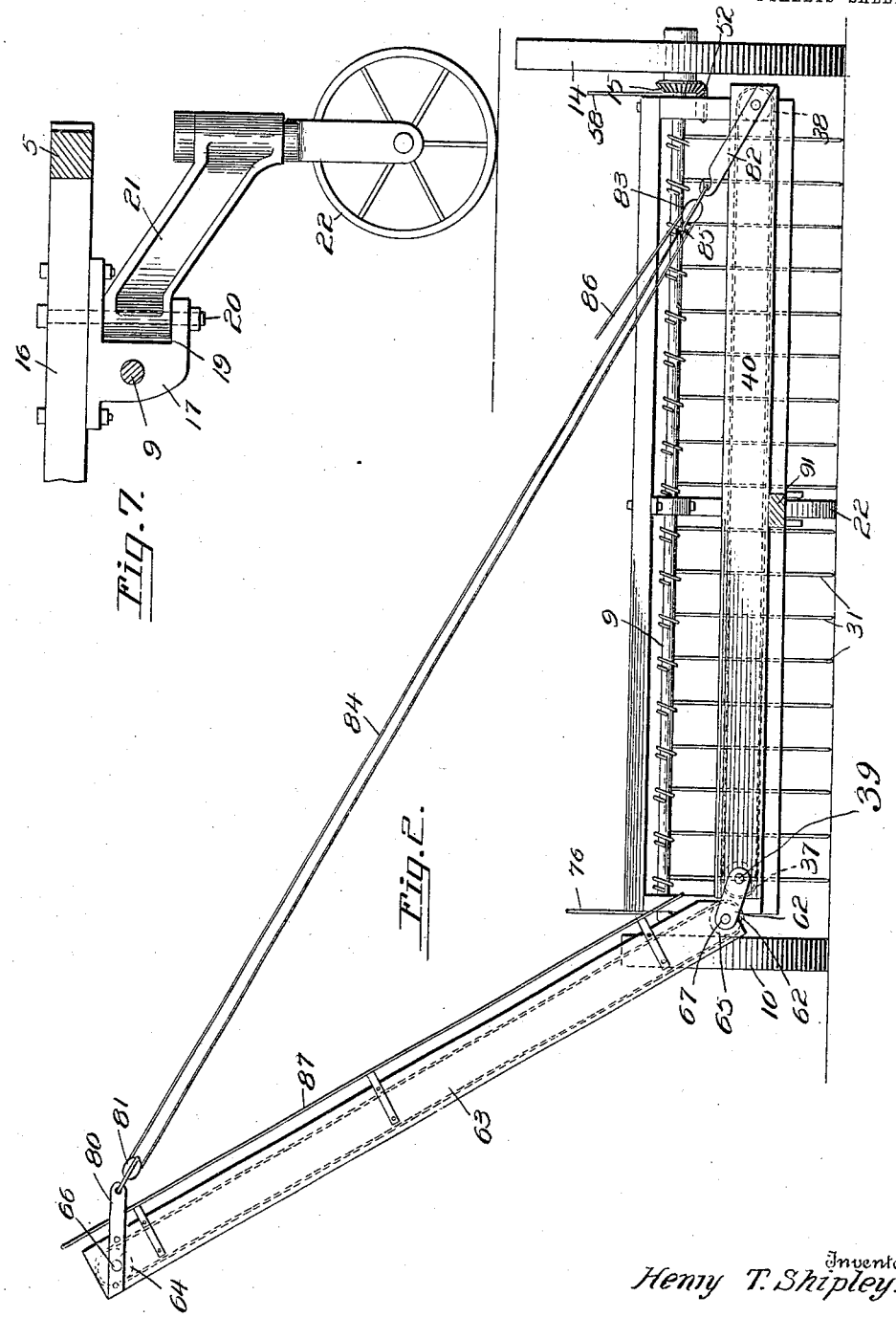

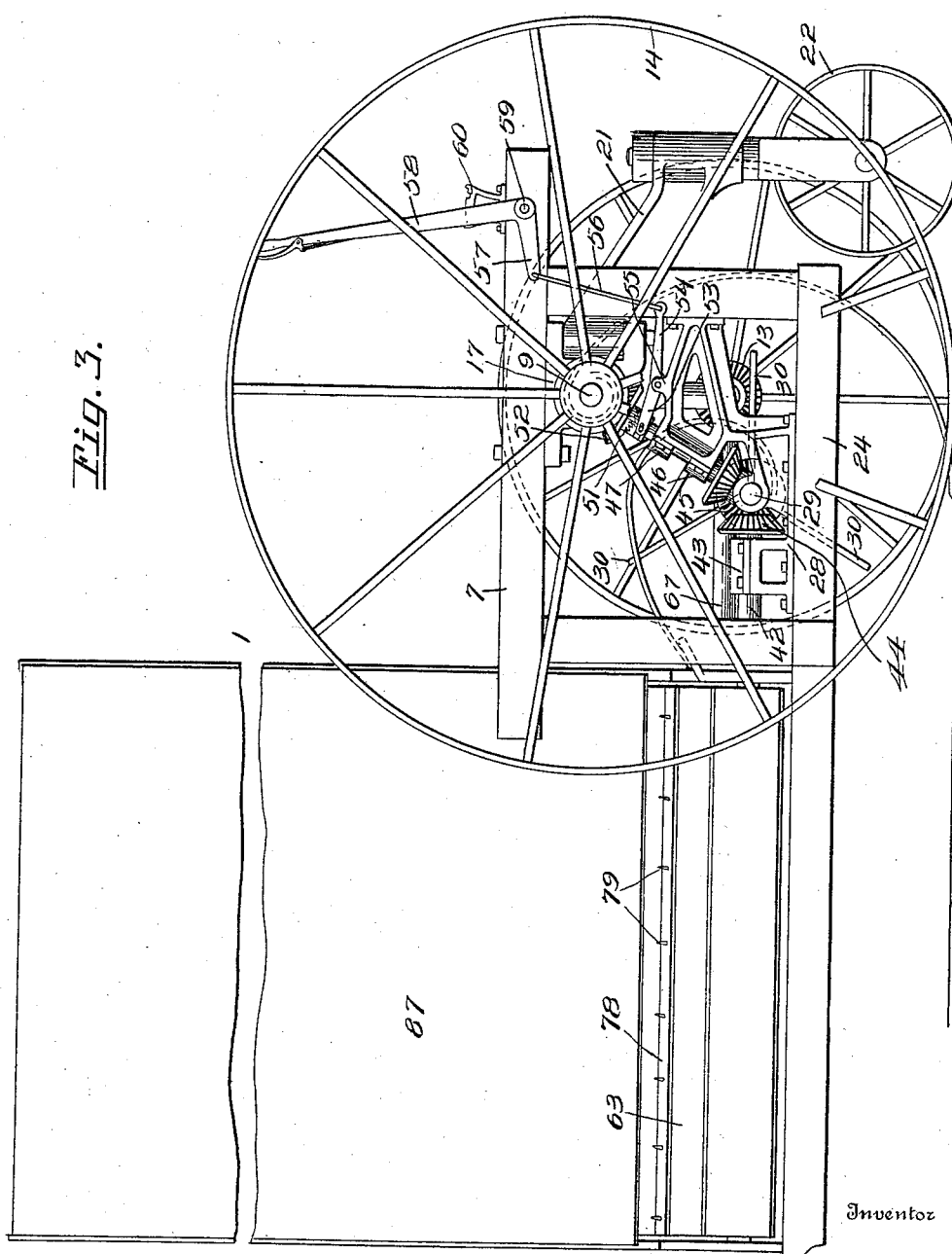

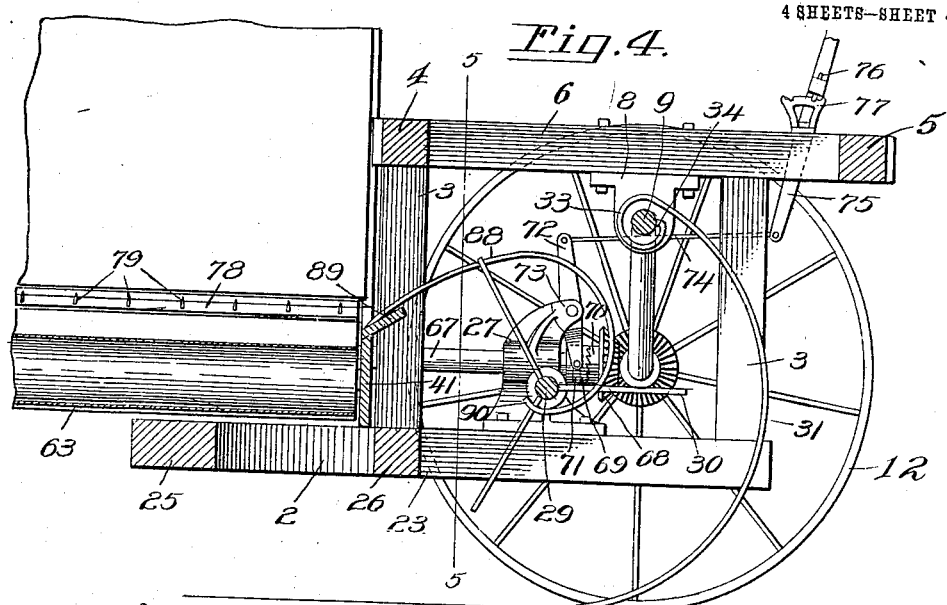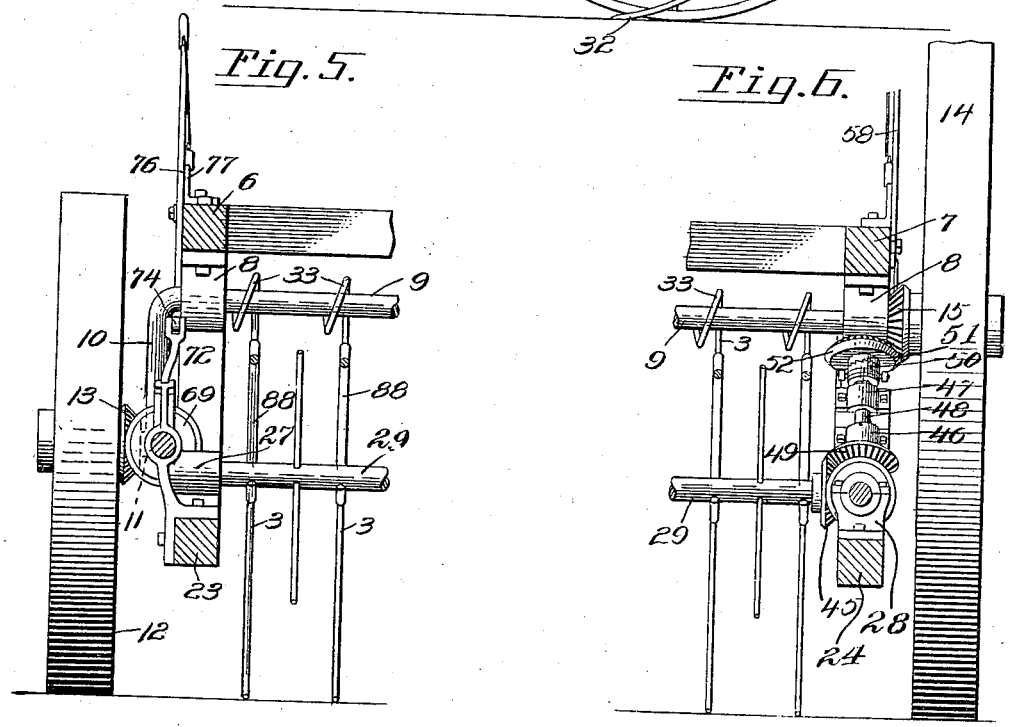

HENRY T. SHIPLEY, OF OSHKOSH, WISCONSIN.

HAY-LOADER.

966,249.  Specification of Letters Patent.  Patented Aug. 2, 1910.

Application filed August 7, 1908. Serial No. 447,426.

*To all whom it may concern:*

Be it known that I, HENRY T. SHIPLEY, a citizen of the United States, residing at Oshkosh, in the county of Winnebago and State of Wisconsin, have invented new and useful Improvements in Hay-Loaders, of which the following is a specification.

This invention relates to the class of harvesters, and more particularly to hay loaders, and has for an object to provide a machine of this character which will be especially adapted to be driven through a field to collect previously deposited hay left by a mower, and to provide means whereby hay may be received from the swath side, and to finally discharge the hay at right angles from the loader whereby it may be deposited into a wagon which may travel at one side of the loader.

A further object of this invention is to provide a hay loader including a collector to elevate the hay from the ground and to deposit it upon an endless conveyer at the front end of the loader and to finally carry the hay from the conveyer to a point at one side of the machine in order that it may be dumped away from the path of movement of said machine.

A further object of this invention is to provide a wheeled frame upon which is supported a revoluble collector for hay and to deposit the latter upon an endless conveyer driven by the ground wheels of the machine.

A further object of this invention is to provide a horizontally disposed conveyer located at the front of the loader to discharge hay upon an angularly adjustable conveyer located at one side of the machine, and to provide a guard upon the angularly adjustable conveyer to effectively prevent scattering of the hay during its travel.

A further object of the invention is to provide a collector, an endless conveyer and a novel form of means for supporting hay after it has been discharged from the collector to hold the same away from working parts of the machine in order that it may be effectively discharged upon said conveyer.

A further object is to provide a wheeled axle, a collector and forks or tines at the rear of the collector for effectively engaging the hay with said collector.

Other objects and advantages will be apparent as the nature of the invention is better disclosed, and it will be understood that changes within the scope of the claims may be resorted to without departing from the spirit of the invention.

In the drawings, forming a portion of this specification, and in which like numerals of reference indicate similar parts in the several views, Figure 1 is a top plan view of the loader, Fig. 2 is a front view of the same, Fig. 3 is an end view showing the parts on an enlarged scale and looking at the machine from the swath side, Fig. 4 is a longitudinal sectional view through a part of the machine, Fig. 5 is a transverse sectional view through a portion of the machine showing the inclined elevator drive shaft, Fig. 6 is a view similar to Fig. 5, showing the horizontally disposed elevator drive shaft and clutch mechanism, Fig. 7 is a detail view of the supporting or caster wheel.

Referring now more particularly to the drawings, there is shown a hay loader 1 comprising a frame 2 upon which is mounted vertical posts or standards 3 for supporting front and rear bars 4 and 5 respectively, and end bars 6 and 7. The bars 4, 5, 6 and 7 are disposed in spaced relation to the frame 2. The end bars 6 and 7 are provided upon their under sides with brackets 8 adapted to support a transversely disposed axle 9. The axle 9 adjacent to the bar 6 is bent downwardly as shown at 10 and outwardly as shown at 11 to support a drive wheel 12 provided upon its inner face with a bevel pinion 13 for a purpose to be hereinafter referred to. The axle 9 at its end opposite to the portion 10 supports a drive wheel 14 similar to the wheel 12, but considerably larger, and this wheel is provided at its inner face with a bevel pinion 15. The bars 4 and 5 are connected midway between their ends by a bar 16 and located upon the under side of this bar is a bracket 17 having a forked horizontally disposed portion 19, and between the arms of said forked portion is pivotally mounted as indicated at 20 a bracket 21 which carries at its lower end a pivotally mounted caster wheel 22 which is thus located at the rear of the machine.

The frame 2 is provided with end bars 23 and 24 respectively, and connecting cross bars 25 and 26. The bar 23 has mounted thereon a vertically extending bracket 27, and the bar 24 has mounted thereon a bracket 28, and said brackets have mounted therein portions of a horizontal shaft 29 provided with a plurality of radial fingers or arms 30.

The shaft 29 and said fingers and arms carried thereby will be hereinafter termed a collector at the rear of the machine. Rearwardly of the collector is shown a plurality of tines 31 having forwardly projected surface engaging ends 32 and coiled ends 33 which are engaged with the axle 9 as indicated at 34. The coiled portions 33 of the tines 31 are provided to offer certain resiliency to the tines as will be readily understood, and it is desirable to construct these tines from spring steel or the like.

At the front end of the loader is shown a horizontally disposed conveyer 35 comprising an endless belt 36 mounted upon rollers 37 and 38 respectively. The roller 37 is mounted upon a shaft 39 mounted at its ends in parallel members 40 and 41, and the roller 38 is mounted upon a shaft 42 carried by the members 40 and 41, and this shaft, at the rear end is also mounted in a journal box 43 on the bracket 28. The shaft 42 carries a bevel pinion 44 in mesh with a similar pinion 45 upon the shaft 29. The bracket 28 is provided with angularly disposed boxes 46 and 47 respectively, and mounted in these boxes is shown a shaft 48 which carries at the lower end thereof a bevel pinion 49 adapted to mesh with the pinion 45 upon the shaft 29. The shaft 48 has slidably mounted thereon a grooved clutch member 50 having an annular serrated face for co-engaging a corresponding face upon a clutch element 51. The element 51 carries a bevel pinion 52 in mesh with the pinion 15 carried by the wheel 14. The clutch member 50 receives the forked arms 53 of a rock arm 54 pivotally mounted midway between its ends between ears 55 upon the bracket 28. The rock arm has connected thereto the lower end of a link 56 which link is also pivotally connected at its upper end to one arm 57 of a bell crank lever 58 which is pivotally mounted as shown at 59 to the bar 7. A suitable rack bar 60 is provided for holding the lever 58 in its adjusted position. It will be seen that a movement of the lever 58 in a rearward direction will elevate the link 56 and move the rock arm 54 to disengage the clutch element 50 from the element 51. It may be mentioned that the pinion 52 is loosely mounted upon the shaft 48 and that when the elements 50 and 51 are engaged with each other, power will be transmitted from the pinion 15 to the shafts 29 and 42 respectively, to operate the endless conveyer 35 and the collector previously described.

An endless conveyer 61 is pivotally connected by means of links 62 to the conveyer 35, and this conveyer is somewhat similar to the conveyer 35 and preferably comprises a belt 63 mounted upon rollers 64 and 65 carried by shafts 66 and 67. The shaft 67 is extended rearwardly, as shown, has a portion mounted in the bracket 27, and this shaft carries at the extreme rear end thereof a pinion 68 which is loosely mounted and is adapted to mesh with the pinion 13 carried by the wheel 12. A sliding clutch element 69 is carried by the shaft 67, is adapted to engage a clutch element 70 carried by the pinion 68, is provided with a collar 71 which receives a rock arm 72 pivotally mounted between ears 73 carried by the bracket 27, and this rock arm, at its upper end, is loosely connected to a link 74. The link 74, at the rear end thereof, is connected to a pivoted lever 75 having a suitable pawl 76 for engaging a rack 77 for holding said lever at the desired adjustment. The belt 63 is provided preferably with the slats 78 having spikes or spurs 79 projecting therefrom to effectively engage material which is being handled. It will be seen that the shaft 67 may be effectively operated to impart motion to the conveyer or belt 63 and to carry the same in the same direction as the conveyer 35, the former being arranged to receive from the latter to carry material upwardly at an angle. To hold the conveyer 61 at the desired angle with respect to the conveyer 35, I provide said conveyer 61 with a bracket 80 which carries a pulley 81, as shown. The conveyer 35 carries a hook 82 which supports a pulley 83, and this pulley and the pulley 81 receive a suitable cable or flexible element 84. One end of the cable 84 is fixed to a portion of the pulley 83 as shown at 85, the cable is then passed over the pulley 81, and finally over the pulley 83 and thus leaves a free end 86 which may be grasped and operated in order that the conveyer 61 may be moved at the desired angle. A suitable guard 87 is located above the conveyer 61 to prevent scattering of material during its travel upon said conveyer.

A plurality of curved fingers 88 are secured to a member 89 adjacent to the conveyer 35, and these fingers have portions 90 curved to lie beneath the shaft 29 as clearly illustrated in Fig. 4 of the drawings. The fingers are preferably disposed between the arms 30 of the collector and are in a position to receive material therefrom, as shown. The fingers are also positioned in the manner that they effectively support material and hold the same away from operative parts of the loader. A suitable draft tongue 91 is provided and extends forwardly from the front end of the loader.

In operation, the loader is driven through a field to collect previously deposited hay from a mower, and assuming the machine to be in operation, it will be seen that hay or material to be gathered will be caught by the tines 31 at the rear of the collector, and the arms 30 of said collector will effectively carry the material in an upward direction and deposit the same upon the fingers 88, and said arms in their movement will engage the material or hay to the extent that it will be moved toward the front of the machine and dumped upon the conveyer 35. During the process of gathering or loading, a vehicle may travel in a position beneath the conveyer 61 to receive material therefrom as will be readily understood, and from the previously described construction it is obvious that the conveyer 61 may be moved at the proper angle to suit different occasions. It is obvious that the frame of the loader is disposed in spaced relation to the surface upon which the wheels of the loader travel, and it will be seen that hay or material may be collected from beneath the frame and carried in an upward direction to be deposited above the frame upon the conveyer 35.

I claim:—

1. A hay loader comprising a portable wheeled frame, a horizontally disposed conveyer mounted upon the forward portion of the frame, a member extending longitudinally at one side of the conveyer, a revolving collector located rearwardly of the conveyer, spaced fingers extended rearwardly from the member of the said conveyer and arranged to receive material from the said collector and discharge it upon the said conveyer, a supporting shaft for the said frame, and a plurality of spaced gathering tines located rearwardly of the collector and having portions coiled about the said shaft and secured thereto.

2. A machine of the class described comprising a portable frame, a conveyer mounted on said frame, a wheeled axle supported by the frame, an angularly adjustable conveyer located in line with the first named conveyer, a longitudinally extending member upon the rear side of the said first named conveyer, a revolving collector shaft geared to the wheels of the first named shaft, the said shaft having mounted thereon a plurality of radial collecting fingers, rearwardly extending spaced fingers supported by the said member of the first named conveyer, the said fingers having their rear ends extended downwardly and beneath the said collector shaft, means for driving the conveyers, and downwardly and forwardly extending gathering tines located rearwardly of the collector shaft.

3. A machine of the class described comprising a portable frame, a wheeled axle supporting the frame, a horizontally disposed conveyer located forwardly of the axle, an angularly adjustable conveyer disposed in line with the first named conveyer, a longitudinally extending member at one side of the first named conveyer, a shaft geared to the said supporting wheels of the axle and provided with a plurality of radial collecting fingers, fingers extending from the said longitudinally extending member of the first named conveyer and having their rear ends extended downwardly and beneath the said shaft, the said collecting fingers being adapted for movement between the said second named fingers and for throwing the collected material thereon, and a plurality of spaced collecting tines supported by the said axle.

In testimony whereof I affix my signature in presence of two witnesses.

HENRY T. SHIPLEY.

Witnesses:
C. A. FLEMING,
MAE MUTTART.